(12) United States Patent
Ueda et al.

(10) Patent No.: US 11,550,207 B2
(45) Date of Patent: Jan. 10, 2023

(54) IMAGE CAPTURING APPARATUS, ACCESSORY, CAMERA SYSTEM INCLUDING IMAGE CAPTURING APPARATUS AND ACCESSORY

(71) Applicant: CANON KABUSHIKI KAISHA, Tokyo (JP)

(72) Inventors: Haruhisa Ueda, Tokyo (JP); Kazuaki Yamana, Tokyo (JP); Haruki Ota, Tokyo (JP); Seishiro Takano, Tokyo (JP); Masahisa Tamura, Tokyo (JP); Kunihiko Sasaki, Tokyo (JP); Katsuhiro Inoue, Tokyo (JP); Toru Matsumoto, Tokyo (JP); Shigehiro Torii, Tokyo (JP); Toshinori Yamazaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/147,583

(22) Filed: Jan. 13, 2021

(65) Prior Publication Data
US 2021/0132472 A1    May 6, 2021

Related U.S. Application Data

(63) Continuation of application No. PCT/JP2018/030063, filed on Aug. 10, 2018.

(51) Int. Cl.
*G03B 17/14* (2021.01)
*G02B 7/14* (2021.01)
(Continued)

(52) U.S. Cl.
CPC .............. *G03B 17/14* (2013.01); *G02B 7/14* (2013.01); *G03B 17/563* (2013.01); *H04N 5/2254* (2013.01)

(58) Field of Classification Search
CPC ...................................................... G02B 17/14
See application file for complete search history.

(56) References Cited

U.S. PATENT DOCUMENTS 6,345,154 B1    2/2002 Kubo
8,770,868 B1    7/2014 Hasuda et al.
(Continued)

FOREIGN PATENT DOCUMENTS

CN    101086603 A    12/2007
JP    10-3116 A    1/1998
(Continued)

OTHER PUBLICATIONS

International Search Report issued in International Application No. PCT/JP2018/030063 dated Nov. 13, 2018, pp. 1-2.
(Continued)

*Primary Examiner* — Noam Reisner
(74) *Attorney, Agent, or Firm* — Carter, DeLuca & Farrell LLP

(57) ABSTRACT

An image capturing apparatus includes a first mount portion and a first cylindrical member that has a color different from a color of the first mount portion and is disposed in a circumferential direction of the first mount portion, an accessory includes an exterior portion, a second mount portion, and a second cylindrical member having a color different from a color of the second mount portion and similar to a color of the first cylindrical member and disposed in a circumferential direction of the second mount portion, and in a state where the accessory is attached to the image capturing apparatus, reference surfaces of the first mount portion and the second mount portion are in contact with each other, and the first cylindrical member and the second cylindrical member are externally exposed regard- (Continued)

less of whether the accessory is attached to or detached from the image capturing apparatus.

42 Claims, 8 Drawing Sheets

(51) Int. Cl.
    *G03B 17/56*     (2021.01)
    *H04N 5/225*     (2006.01)

(56) References Cited

U.S. PATENT DOCUMENTS

| | | | | |
|---|---|---|---|---|
| 2005/0031338 A1* | 2/2005 | Koyama | ............... | G03B 17/14 396/531 |
| 2007/0280679 A1* | 12/2007 | Kato | ............... | G03B 17/00 396/529 |
| 2014/0126026 A1 | 5/2014 | Inoue | | |
| 2019/0391359 A1 | 12/2019 | Torii | | |
| 2021/0132472 A1* | 5/2021 | Ueda | ............... | G03B 17/14 |

FOREIGN PATENT DOCUMENTS

| JP | 2005-070712 A | 3/2005 |
|---|---|---|
| JP | 2009-104185 A | 5/2009 |

OTHER PUBLICATIONS

Anonymous "Immersive Edge-Feature Design a700" Sony Design (Sep. 2007) pp. 1-2, Internet: <https:www.sony.eo.jp/Fun/design/activity/product/dsir-a700_03.html>.

Notification of the First Office Action issued by the China National Intellectual Property Administration dated Oct. 25, 2021 in corresponding CN Patent Application No. 201880096578.8, with English translation.

Extended European Search Report issued by the European Patent Office dated Feb. 25, 2022 in corresponding EP Patent Application No. 18929123.0.

Examination Report issued by the Intellectual Property Office of India dated Jan. 20, 2022 in corresponding IN Patent Application No. 202147008546, with English translation.

Sony Corporation, "Read This First," Digital Single Lens Reflex Camera, DSLR-A700 Manual, 2007, https://www.sony.p/ServiceArea/impdf/manual/32169190DSLR, with English manual retrieved from https://www.sony.com/electronics/support/product/dslr-a700/manuals.

Office Action dated Dec. 28, 2021 by the Taiwan Patent Office in corresponding TW Patent Application No. 108126934, with English translation.

Notice of Reasons for Rejection issued in corresponding JP Patent Application No. 2020-535464, dated Sep. 6, 2022, with English translation.

\* cited by examiner

IMAGE CAPTURING APPARATUS, ACCESSORY, CAMERA SYSTEM INCLUDING IMAGE CAPTURING APPARATUS AND ACCESSORY

CROSS-REFERENCE TO RELATED APPLICATIONS

This application is a Continuation of International Patent Application No. PCT/JP2018/030063, filed Aug. 10, 2018, which is hereby incorporated by reference herein in its entirety.

BACKGROUND OF THE INVENTION

Field of the Invention

The present invention relates to an image capturing apparatus that includes a mount and an accessory attachable to and detachable from the image capturing apparatus.

Background Art

Mount systems that connect a camera accessory, such as an interchangeable lens, and a camera as an image capturing apparatus together and can electrically connect them have been known. For example, a mount system that includes a plurality of camera-side contact surfaces on a camera and a plurality of lens-side contact surfaces corresponding to the plurality of camera-side contact surfaces on a camera accessory is known.

Among combinations of a camera and a camera accessary including the above-described mount system, there can be not a matching combination, examples of which includes a case where a lens-side flange focal distance and a camera-side flange focal distance are different, a case where an angle of view of a lens and an image sensor size are different, and the like. Attachment of a combination of a camera and a camera accessory that are different in flange focal distance leads to an error of not focusing on an image capturing surface. Attachment of a combination of a camera and a camera accessory that are different in angle of view of an interchangeable lens and image sensor size results in images having dark peripheries or images having an angle of view that is not intended by a user.

To prevent a camera and a camera accessory that are not a matching combination from being connected together, methods for preventing physical attachment by using different diameters or using projections with a different phase between a lens-side mount and a camera-side mount have been discussed. In other methods for preventing attachment of a camera accessory to a camera that does not match the camera accessory, a user is notified with emphasis that the camera and the camera accessory are not a matching combination.

Patent Document 1 discusses a technique, for bringing a projecting portion of a lens having a short back focus, among lenses having the same flange focal distance, into contact with a wall portion of the camera body, to prevent erroneous attachment of a lens having a short back focus to a camera body to which a lens having a short back focus is not supposed to be attached.

Patent Document 2 discusses a technique for providing a ring-shaped color region having a specific color, different between mount portions, on parallel surfaces in joint surfaces of respective mounts of an interchangeable lens and an image capturing apparatus, to enable a user to recognize whether the interchangeable lens and the image capturing apparatus are compatible in attaching the interchangeable lens to the image capturing apparatus.

CITATION LIST

Patent Literature

PTL 1: Japanese Patent Laid-Open No. 2005-70712
PTL 2: Japanese Patent Laid-Open No. 2009-104185

According to the technique discussed in Patent Document 1, however, a user may not recognize with ease whether a camera and a camera accessory are not a matching combination by visual observation, since there can be a case where mount diameters appear to be substantially the same, for example. In this case, a user cannot recognize whether a camera and a camera accessory are a matching combination unless the user actually attaches the camera accessory to the camera. Thus, in capturing images with a plurality of camera accessories, the user needs to check in advance whether the plurality of camera accessories is attachable.

According to the technique discussed in Patent Document 2, since the color regions having the specific color is on the joint surfaces of the mount portions of the interchangeable lens and the image capturing apparatus, it is difficult for the user to determine whether the image capturing apparatus and the interchangeable lens are a matching combination in a case where the user checks the image capturing apparatus and the interchangeable lens from a position where the user cannot see the joint surfaces.

Especially in a state where the camera accessory is attached to the camera, the joint surfaces (contact surfaces) are not externally exposed from the apparatus, and a bayonet nail portion, a terminal for electric connection, and a mark for attachment of the mount portions which are disposed on the mount portions are not visible. In this case, the user may not be able to determine whether the camera and the camera accessory are a matching combination, and if image capturing is performed using a non-matching combination, unnatural images that are not intended by the user may be captured.

The present invention is directed to facilitating easy recognition of a matching combination of an image capturing apparatus and an accessory regardless of a state where the accessory is attached to or detached from the image capturing apparatus.

SUMMARY OF THE INVENTION

To achieve the above mentioned objectives, the present invention is characterized in that a camera system comprising an image capturing apparatus and an accessory that is attachable to and detachable from the image capturing apparatus, wherein the image capturing apparatus includes a first mount portion and a first cylindrical member that has a color different from a color of the first mount portion and is disposed in a circumferential direction of the first mount, wherein the accessory includes an exterior portion, a second mount portion, and a second cylindrical member having a color different from a color of the second mount portion and similar to the color of the first cylindrical member and disposed in a circumferential direction of the second mount, and wherein in a state where the accessory is attached to the image capturing apparatus, reference surfaces of the first mount portion and the second mount portion are in contact with each other, and the first cylindrical member and the second cylindrical member are externally exposed regardless of whether the accessory is attached to or detached from the image capturing apparatus.

Further features of the present invention will become apparent from the following description of exemplary embodiments with reference to the attached drawings.

DESCRIPTION OF THE EMBODIMENTS

Exemplary Embodiments

Various exemplary embodiments of the present invention will be described below with reference to the drawings.

(Basic Structure of Camera System)

Figure 1:
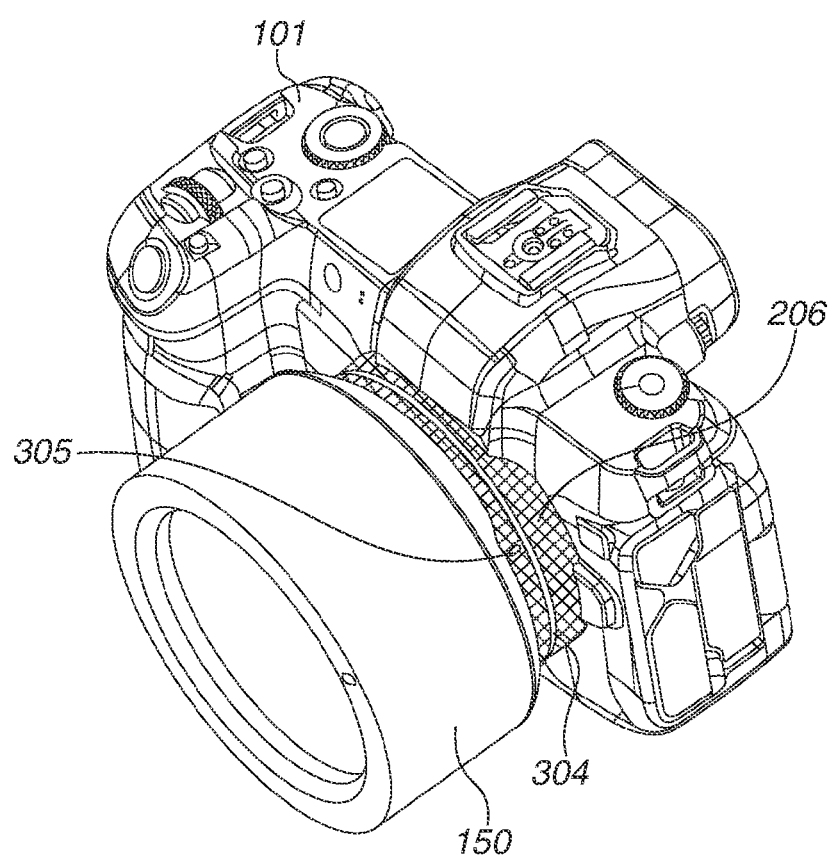
FIG. 1 is a front perspective diagram illustrating a lens unit 150 and a digital camera 100 to which the lens unit 150 is removably attached.
Figure 2A:
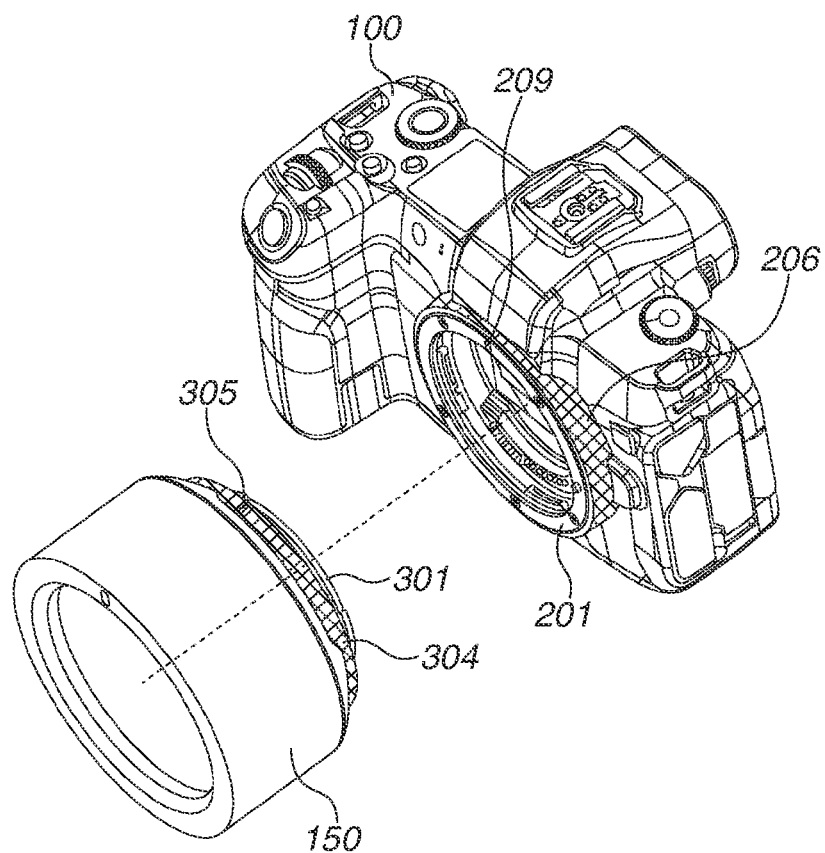
FIG. 2A is a schematic diagram illustrating a method of attaching the lens unit 150 to the digital camera 100.
Figure 2B:
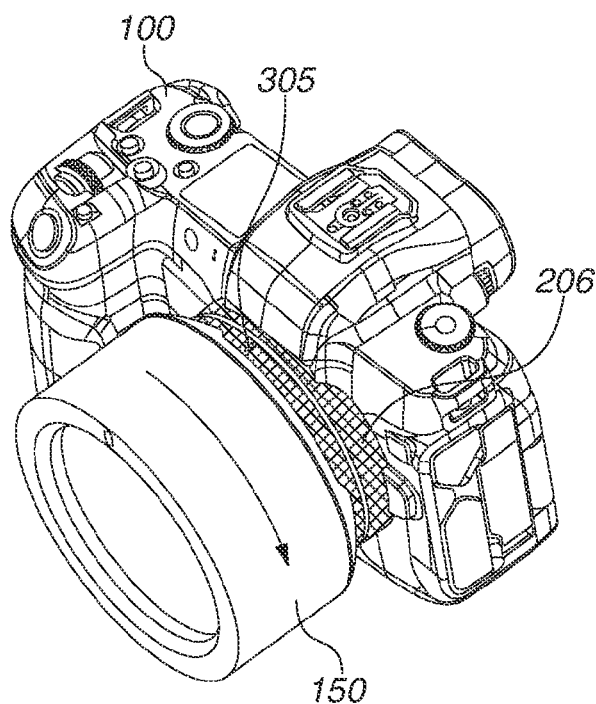
FIG. 2B is a schematic diagram illustrating a method of attaching the lens unit 150 to the digital camera 100.
Figure 3A:
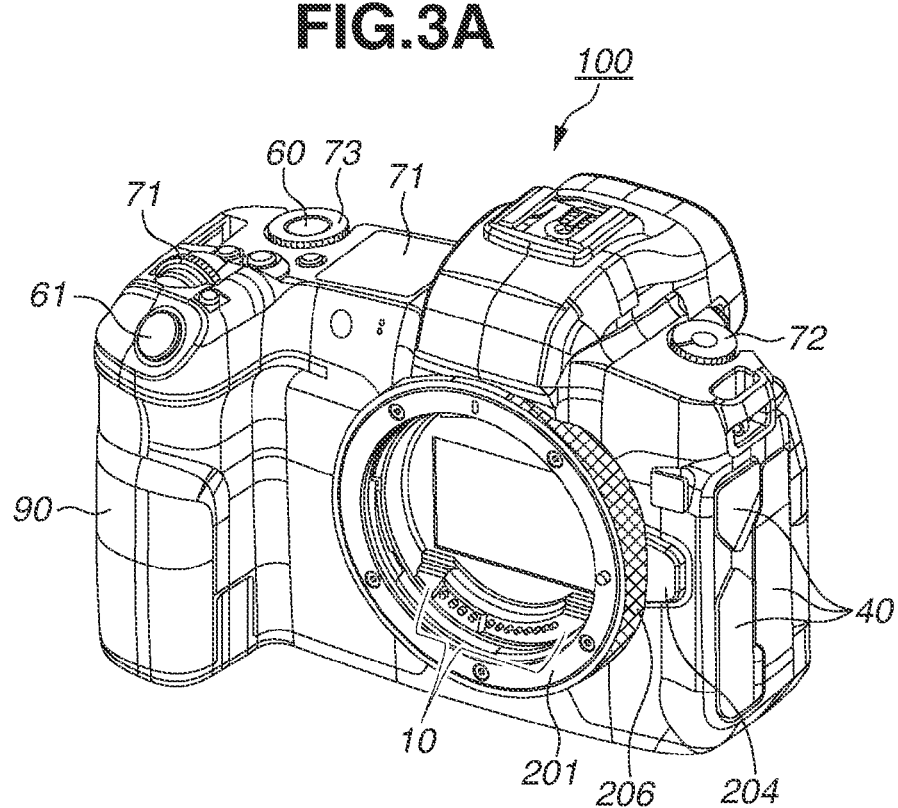
FIG. 3A is an external diagram illustrating the digital camera 100.
Figure 3B:
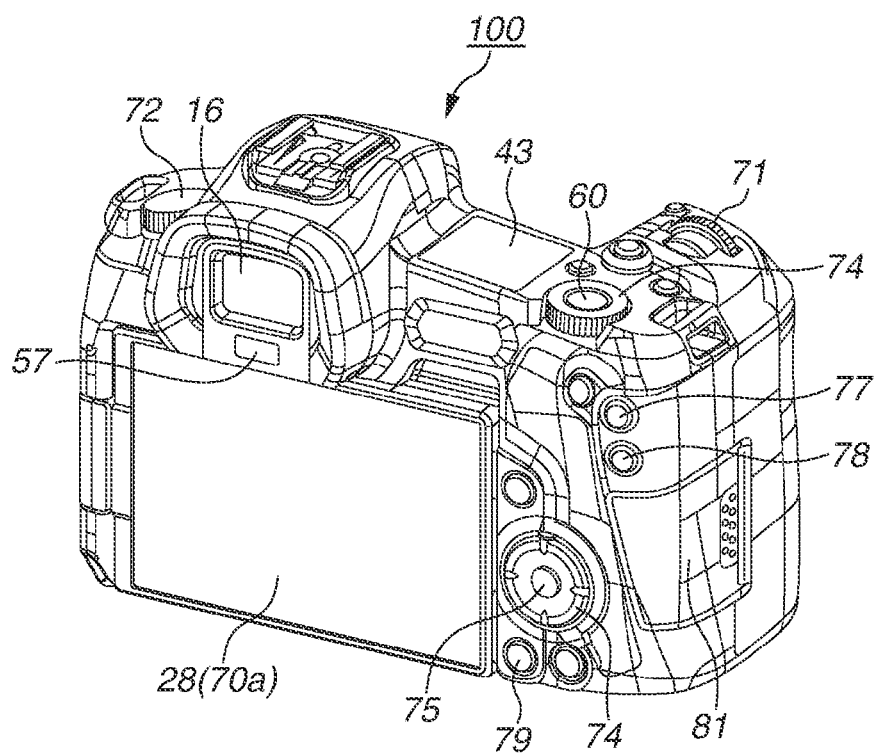
FIG. 3B is an external view illustrating the digital camera 100.

FIG. 1 is a front perspective view illustrating a lens unit 150, which is a camera accessory as an example of an apparatus to which the present invention is applicable, and a digital camera 100 to which the lens unit 150 is removably attached. FIG. 2 are schematic diagrams illustrating a method of attaching the lens unit 150 to the digital camera 100. FIG. 2A illustrates a state before the lens unit 150 is attached to the digital camera 100, and FIG. 2B illustrates an attachment state. FIG. 3 are external views illustrating the digital camera 100. FIG. 3A is a front perspective diagram illustrating the digital camera 100, and FIG. 3B is a rear perspective diagram illustrating the digital camera 100.

As illustrated in FIG. 1, in a state where the lens unit 150 is attached to the digital camera 100, a camera mount recognition ring 206, a lens mount recognition ring 304, and a lens mount mark 305, which will be described below, are externally exposed from the apparatus and are visible to a user. The camera mount recognition ring 206 and the lens mount recognition ring 304 are hatched to be highlighted in the drawings described below.

As illustrated in FIGS. 2A and 2B, the digital camera 100 and the lens unit 150 are relatively rotated (moved) from an unlock position to a lock position with reference surfaces (contact surfaces) of a camera mount 201 and a lens mount 301 being in contact with each other and are connected together. The state in FIG. 2B illustrates the unlock position of the lens mount 301 with respect to the camera mount 201. From this state, the lens unit 150 is relatively rotated in the direction of an arrow specified in the drawing with respect to the digital camera 100 to move the lens mount 301 to the lock position with respect to the camera mount 201. Rotation phases of an attachment preparation position (unlock position) and an attachment completion position (lock position) of the camera mount 201 and the lens mount 301 are visible with a camera mount mark 209 of the digital camera 100 and the lens mount mark 305 of the lens unit 150. Even in a state where the lens unit 150 is attached to the digital camera 100, the lens mount mark (first mark) 305 is visible, whereas the camera mount mark (second mark) 209 is disposed at a position where the camera mount mark 209 is not visible. The lens mount mark 305 and the camera mount mark 209 correspond to each other when the relative positional relationship (rotation phase) between the camera mount 201 and the lens mount 301 is at the attachment preparation position (lock position). A mount structure that is an attachment portion of the digital camera 100 and the lens unit 150 will be described below.

A display unit 28 is a display unit that displays images and various types of information and is disposed at a camera rear surface. A touch panel 70a detects touch operations on a display surface (operation surface) of the display unit 28. An outside-finder display unit 43 is a display unit that is disposed at a camera top surface and displays various camera setting values, such as a shutter speed and an aperture. A shutter button 61 is an operation unit for issuing an image capturing instruction. A mode selection switch 60 is an operation unit for switching various modes. A terminal cover 40 is a cover that protects connectors (not illustrated) for connection cables that connect a connection cable of an external device and the digital camera 100. A main electronic dial 71 is a rotary operation member of an operation unit 70, and the setting values, such as the shutter speed or aperture, can be changed by rotating the main electronic dial 71. A power switch 72 is an operation member for turning on/off a power source of the digital camera 100. A sub-electronic dial 73 is included in the operation unit 70, is a rotary operation member of the operation unit 70, and is for moving a selection frame or forwarding an image. A cross key 74 is a cross key (four-direction key) of the operation unit 70, and upper, lower, left, and right portions of the cross key 74 can each be pressed. An operation corresponding to a pressed portion of the cross key 74 is performed. A SET button 75 is included in the operation unit 70, is a press button, and is used mainly for setting a selected item.

An auto-exposure (AE) lock button 77 is included in the operation unit 70, and an exposure state is fixed by pressing the AE lock button 77 in an the image capturing standby state. An enlargement button 78 is included in the operation unit 70 and is an operation button for turning on/off an enlargement mode during live view display in an image capturing mode. A live view (LV) image can be enlarged or reduced by turning on the enlargement mode and then operating the main electronic dial 71. In a reproduction mode, the enlargement button 78 functions as an enlargement button for enlarging a reproduction image and increasing an enlargement rate. A reproduction button 79 is included in the operation unit 70 and is an operation button for switching between the image capturing mode and the reproduction mode. In response to the reproduction button 79 being pressed during the image capturing mode, the image capturing mode is changed to the reproduction mode, and the newest image among images recorded in a recording medium 200 is displayed on the display unit 28. The operation unit 70 includes a menu button (not illustrated), and in response to the menu button being pressed, a menu screen for setting various settings is displayed on the display unit 28. A user can intuitively set various settings using the menu screen displayed on the display unit 28, the cross key 74, and the SET button 75.

An eyepiece portion 16 is an eyepiece portion of an eyepiece finder (look-in type finder), and a user can observe a video image displayed on an electronic viewfinder (EVF) 29 disposed inside through the eyepiece portion 16. An eye detection unit 57 is an eye detection sensor that detects whether an eye of a person capturing an image is in the proximity of the eyepiece portion 16. A cover 81 is a cover for a slot that stores the recording medium 200. A grip portion 90 is a holding portion having a shape that is easy for a user holding the digital camera 100 to grip with the right hand of the user. The shutter button 61 and the main electronic dial 71 are disposed at positions where a user can operate the shutter button 61 and the main electronic dial 71 with the forefinger of the right hand while hold the digital camera 100 by gripping the grip portion 90 with the little finger, the ring finger, and the middle finger of the right hand. The sub-electronic dial 73 is disposed at a position where the user can operate the sub-electronic dial 73 with the thumb of the right hand in the above-described state. A camera mount 201 is for attachment of a camera accessory, such as the lens unit 150, and terminals 10 are electrical connection contact points including communication terminals via which the digital camera 100 communicates with the lens (attachable/detachable).

Figure 4:
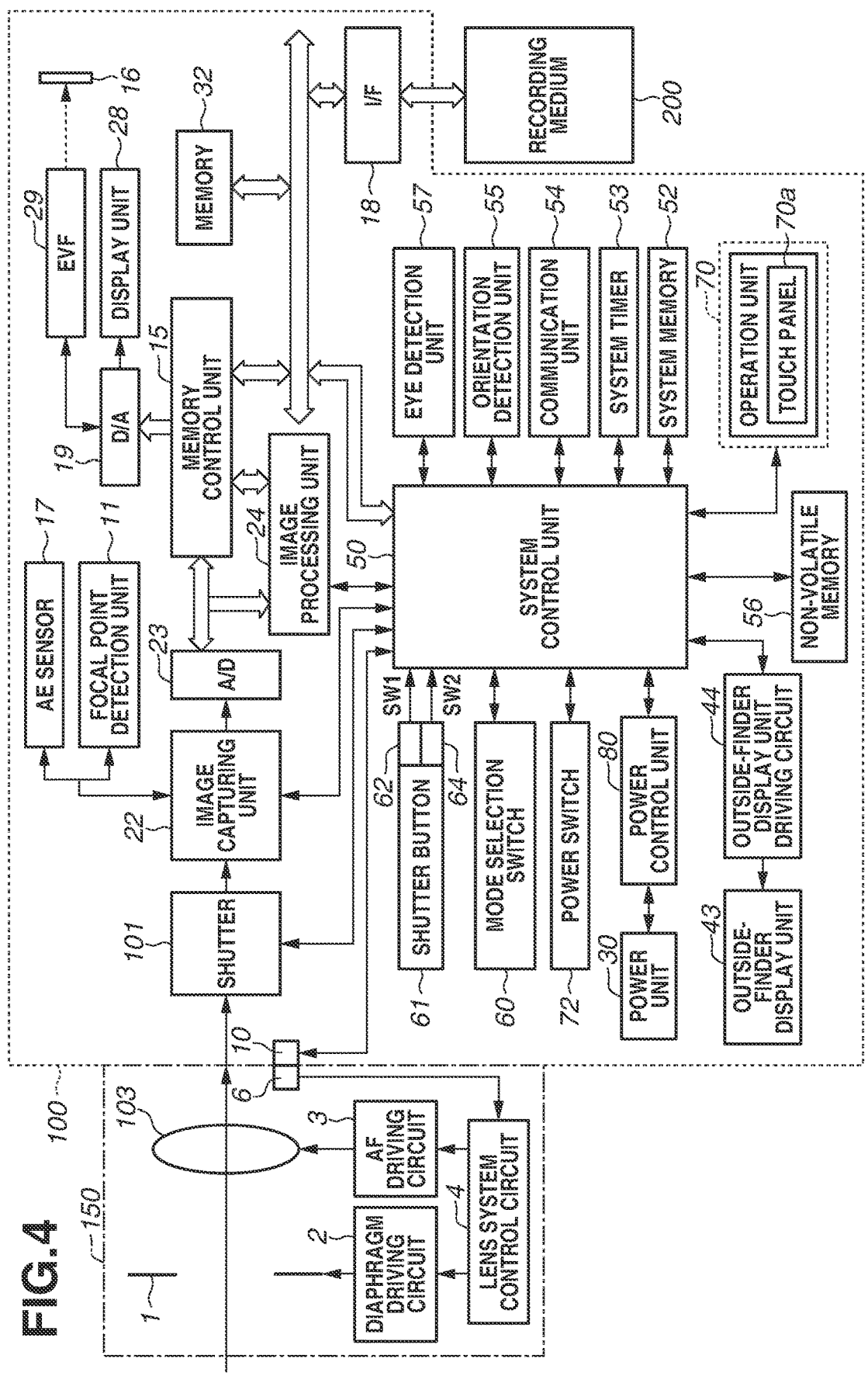
FIG. 4 is a schematic block diagram illustrating an example of a hardware configuration of the digital camera 100 and the lens unit 150.

FIG. 4 is a schematic block diagram illustrating an example of a hardware configuration of the digital camera 100 and the lens unit 150.

In FIG. 4, the lens unit 150 is a lens unit that includes an interchangeable imaging lens. A lens 103 normally includes a plurality of lenses, but for simplification, only a single lens is illustrated therein. Terminals 6 and 10 are electrical contact points for use in electrical connection and include communication terminals for communication between the lens unit 150 and the digital camera 100 and terminals for power supply from the digital camera 100 to the lens unit 150. The lens unit 150 communicates with a system control unit 50 via the terminals 6 and 10, and a lens system control circuit 4 in the lens unit 150 controls a diaphragm 1 via a diaphragm driving circuit 2 and adjusts a focal point by changing the position of the lens 103 via an autofocus (AF) driving circuit 3.

An AE sensor 17 measures the luminance of a subject through the lens unit 150.

A focal point detection unit 11 outputs defocus amount information to the system control unit 50. The system control unit 50 controls the lens unit 150 based on the defocus amount information and performs phase difference AR The focal point detection unit 11 can be a dedicated phase difference sensor or an image capturing surface phase difference sensor of an image capturing unit 22.

A shutter 101 is a focal plane shutter for freely controlling the exposure time of the image capturing unit 22 under control by the system control unit 50.

The image capturing unit 22 is an image sensor, such as a charge-coupled device (CCD) sensor or a complementary metal oxide semiconductor (CMOS) sensor that converts optical images into electric signals. An analog/digital (A/D) conversion unit 23 converts analog signals into digital signals. The A/D conversion unit 23 is used to convert analog signals output from the image capturing unit 22 into digital signals.

An image processing unit 24 performs predetermined pixel interpolation, resizing processing, such as reduction, and color conversion processing on data from the A/D conversion unit 23 or data from a memory control unit 15. The image processing unit 24 performs predetermined calculation processing using captured image data. The system control unit 50 performs exposure control and distance measurement control based on calculation results obtained by the image processing unit 24. Autofocus (AF) processing, auto-exposure (AE) processing, and flash pre-emission (EF) processing of a through-the-lens (TTL) method are thus performed. The image processing unit 24 further performs predetermined calculation processing using captured image data, and automatic white balance (AWB) processing of the TTL method is performed based on the obtained calculation result.

Output data from the A/D conversion unit 23 is written directly to a memory 32 via the image processing unit 24 and the memory control unit 15 or via the memory control unit 15. The memory 32 stores image data captured by the image capturing unit 22 and converted into digital data by the A/D conversion unit 23 and image data for display on the display unit 28 or the EVF 29. The memory 32 has a sufficient capacity to store a predetermined number of still images and a predetermined length of time of moving images and audio.

The memory 32 is also a memory (video memory) for image display. A digital/analog (D/A) conversion unit 19 converts data for image display stored in the memory 32 into analog signals and feeds the converted analog signals to the display unit 28 or the EVF 29. The data for image display stored in the memory 32 is thus displayed on the display unit 28 or the EVF 29 via the D/A conversion unit 19. The display unit 28 and the EVF 29 perform displaying on a display device, such as a liquid crystal display (LCD) or organic electroluminescent (organic EL) display, based on the analog signals from the D/A conversion unit 19. Digital signals that are A/D converted by the A/D conversion unit 23 and stored in the memory 32 are converted into analog signals by the D/A conversion unit 19, and the converted analog signals are sequentially transferred to the display unit 28 or the EVF 29 and thus displayed to perform live view (LV) display. Hereinafter, an image displayed in live view will be referred to as "LV image".

Various camera setting values, such as the shutter speed and aperture are displayed on the outside-finder display unit 43 via an outside-finder display unit driving circuit 44.

A non-volatile memory 56 is an electrically erasable/recordable memory and, for example, an electrically erasable programmable read-only memory (EEPROM) is used. The non-volatile memory 56 stores constant numbers for operations of the system control unit 50 and programs. As used herein, the term "program" refers to a program for executing various flowcharts described below according to the present exemplary embodiment.

The system control unit 50 is a control unit including at least one processor or circuit and controls the entire digital camera 100. The system control unit 50 executes the programs stored in the non-volatile memory 56 to realize below-described processes according to the present exemplary embodiment. A random access memory, for example, is used as a system memory 52, and constant numbers and variable numbers for operations of the system control unit 50 and programs read from the non-volatile memory 56 are developed to the system memory 52. The system control unit 50 controls the memory 32, the D/A conversion unit 19, the display unit 28 to control display, and the like.

A system timer 53 is a time measurement unit that measures a time for use in various types of control and measures the time of a built-in clock.

The mode selection switch 60, a first shutter switch 62, a second shutter switch 64, and the operation unit 70 are an operation unit for inputting various operation instructions to the system control unit 50. The mode selection switch 60 switches an operation mode of the system control unit 50 to one of a still image capturing mode, a moving image capturing mode, and the reproduction mode. Modes of the still image capturing mode include an automatic image capturing mode, an automatic scene discrimination mode, a manual mode, an aperture priority mode (Av mode), a shutter speed priority mode (Tv mode), and a program AE mode (P mode). There are also various scene modes, in which an image capturing setting for each image capturing scene is set, a custom mode, and the like. Using the mode selection switch 60, a user can switch directly to one of the modes. Alternatively, after switching to an image capturing mode list screen using the mode selection switch 60, a user can select a mode from among a plurality of displayed modes and switch to the selected mode using another operation member. Similarly, the moving image capturing mode can include a plurality of modes.

The first shutter switch 62 is turned on during an operation of the shutter button 61 of the digital camera 100, i.e., half-press (image capturing preparation instruction), and a first shutter switch signal SW1 is generated. In response to the first shutter switch signal SW1, image capturing preparation operations, such as AF processing, AE processing, AWB processing, and EF processing, are started.

The second shutter switch 64 is turned on at the completion of the operation of the shutter button 61, i.e., full-press (image capturing instruction), and a second shutter switch signal SW2 is generated. In response to the second shutter switch signal SW2, the system control unit 50 starts a series of image capturing processing operations from the signal reading from the image capturing unit 22 to the writing of a captured image as an image file to a recording area of the memory 32 and the recording medium 200.

The operation unit 70 is various operation members as an input unit that receives user operations. The operation unit 70 includes at least the following operation units, the shutter button 61, the main electronic dial 71, the power switch 72, the sub-electronic dial 73, the cross key 74, the SET button 75, a moving image button 76, the AE lock button 77, the enlargement button 78, and the reproduction button 79. The touch panel 70a and the display unit 28 are integrated together. For example, the touch panel 70a has light transmittance that does not disturb displays on the display unit 28, and the touch panel 70a is attached to a top layer of the display surface of the display unit 28. Input coordinates on the touch panel 70a are associated with display coordinates on a display screen of the display unit 28. This makes it possible to provide a graphical user interface (GUI) that enables a user to intuitively operate a screen displayed on the display unit 28.

A power control unit 80 includes a battery detection circuit, a direct current (DC)-DC converter, and a switch circuit that switches a block to be supplied with power, and the power control unit 80 detects whether a battery is attached, the battery type, and the battery level. The power control unit 80 controls the DC-DC converter based on the detection results and instructions from the system control unit 50 and supplies necessary voltages to components including the recording medium 200 for a period needed. A power unit 30 includes a primary battery, such as alkali battery or a lithium battery, a secondary battery, such as a nickel cadmium (NiCd) battery, a nickel metal hydride (NiMH) battery, or a lithium (Li) battery, and an alternating current (AC) adapter.

A recording medium interface (recording medium I/F) 18 is an interface for the recording medium 200, such as a memory card or hard disk. The recording medium 200 is a recording medium, such as a memory card, for recording captured images and includes a semiconductor memory, magnetic disk or the like.

A communication unit 54 connects wirelessly or via wired cables and transmits and receives video signals and audio signals. The communication unit 54 can connect to a wireless local area network (wireless LAN) and the Internet. The communication unit 54 can communicate with external devices via Bluetooth® or Bluetooth Low Energy. The communication unit 54 can transmit images (including LV images) captured by the image capturing unit 22 and images recorded on the recording medium 200 and can receive images and other various types of information from external devices.

An orientation detection unit 55 detects an orientation of the digital camera 100 in the gravity direction. Whether an image captured by the image capturing unit 22 is an image captured with the digital camera 100 held horizontally or vertically is discriminated based on the orientation detected by the orientation detection unit 55. The system control unit 50 can add orientation information based on the orientation detected by the orientation detection unit 55 to the image file of the image captured by the image capturing unit 22 and can rotate an image and record the rotated image. An acceleration sensor, gyro sensor or the like can be used as the orientation detection unit 55. Movements (pan, tilt, upliftment, whether the digital camera 100 is at rest) of the digital camera 100 are detectable using the acceleration sensor or gyro sensor as the orientation detection unit 55.

The eye detection unit 57 is an eye detection sensor that detects (approach detection) approach of an eye (object) (eye approach) to the eyepiece portion 16 of the finder and separation of the eye (eye separation) from the eyepiece portion 16. The system control unit 50 switches the display (display state)/non-display (non-display state) of the display unit 28 and the EVF 29, based on the state detected by the eye detection unit 57. More specifically, in a case where at least the state is the image capturing standby state and a display destination is to be switched automatically, while an eye is not approaching, the display destination is switched to the display unit 28, and the display of the display unit 28 is on while the display of the EVF 29 is off. While an eye approaches, the display destination is switched to the EVF 29, and the display of the EVF 29 is on while the display of the display unit 28 is off. The eye detection unit 57 can use, for example an infrared proximity sensor and detects an object approaching the eyepiece portion 16 of the finder including the EVF 29 built therein. In a case where an object approaches, infrared rays emitted from a light emitting unit (not illustrated) of the eye detection unit 57 are reflected, and the reflected infrared rays are received by a light receiving unit (not illustrated) of the infrared proximity sensor. How close an approaching object is to the eyepiece portion 16 (approaching eye distance) is determined based on the amount of received infrared rays. The eye detection unit 57 performs eye detection to detect the proximity distance of an object to the eyepiece portion 16 as described above. In the non-eye-approach state (non-proximity state), in a case where an approaching object is detected at a predetermined distance or shorter from the eyepiece portion 16, the detected object is determined as being approaching. In the eye approach state (proximity state), in a case where the detected approaching object is moved away to a predetermined distance or longer, the object is determined as being separated. A threshold value for eye approach detection and a threshold value for eye separation detection can be different by providing, for example, a hysteresis. After an eye approach is detected, the eye approach state continues until an eye separation is detected. After an eye separation is detected, the non-eye-approach state continues until an eye approach is detected. The infrared proximity sensor is a mere example, and the eye detection unit 57 can employ any other sensor that can detect approach of an eye or object that can be considered as an eye approach.

(Detailed Description of Mount Structure)

Next, a mount structure that is an attachment portion of the digital camera 100 and the lens unit 150 will be described below.

Figure 5A:
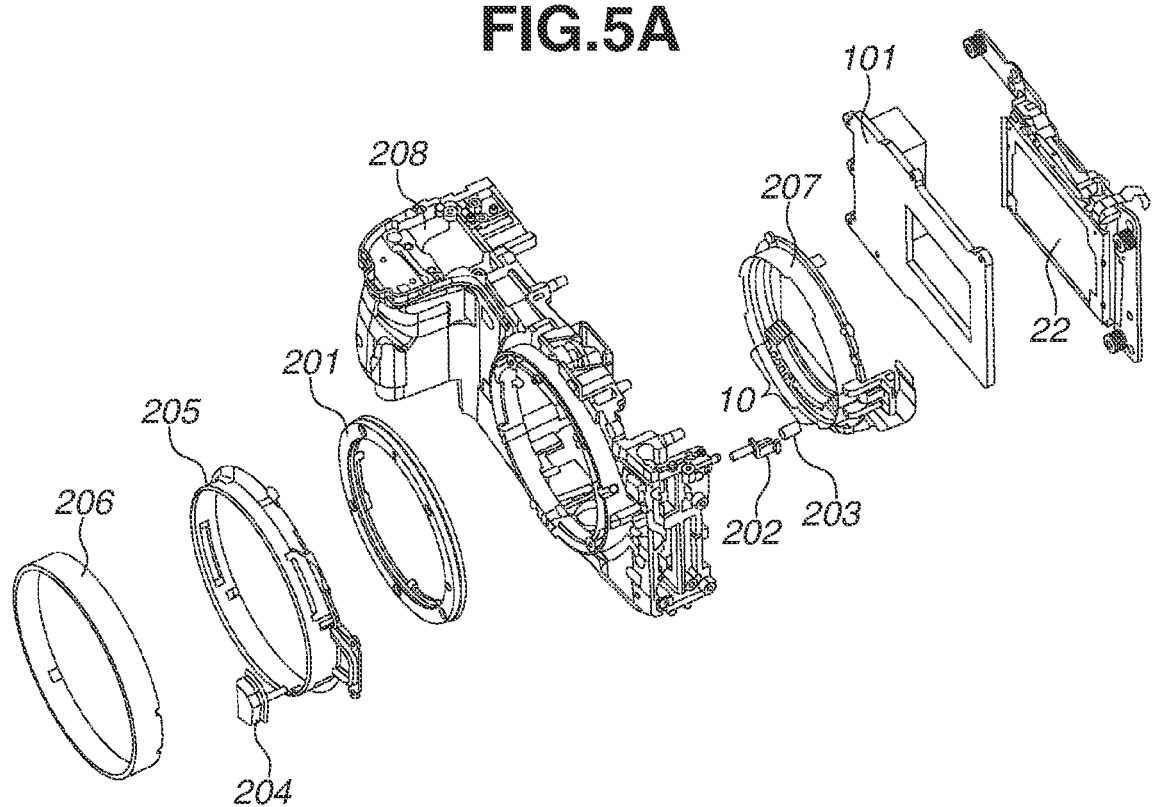
FIG. 5A is an illustrative diagram of an exploded perspective view illustrating the digital camera 100 and the lens unit 150.
Figure 5B:
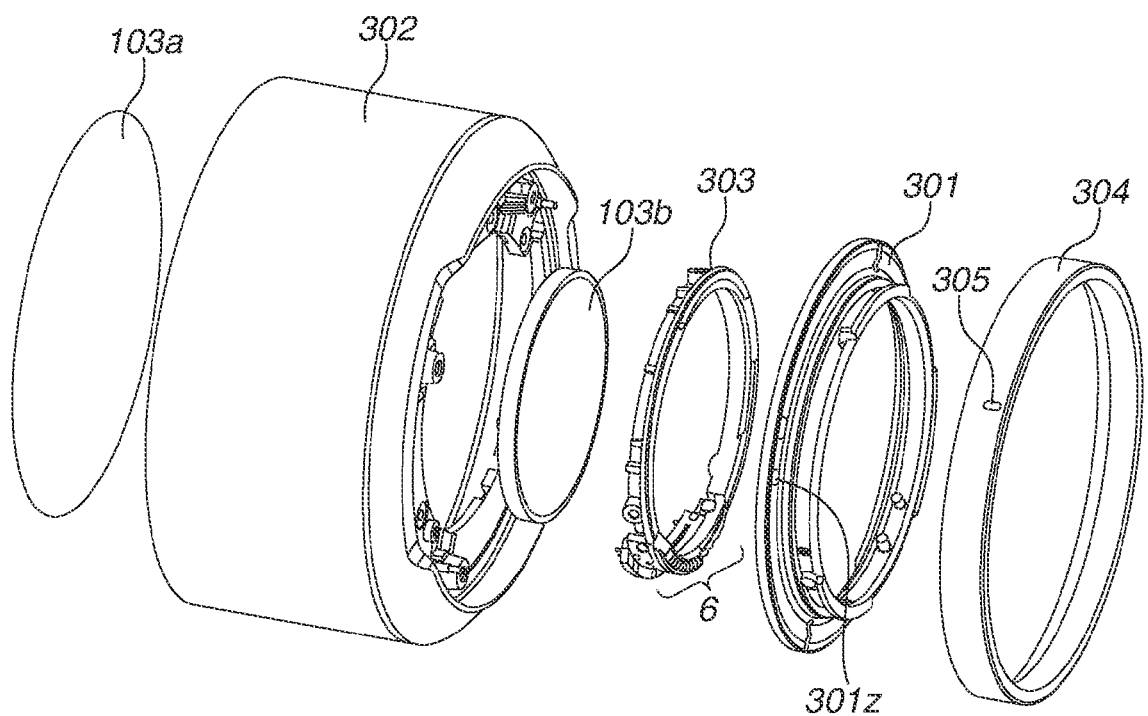
FIG. 5B is an illustrative diagram of an exploded perspective view illustrating the digital camera 100 and the lens unit 150.

FIG. 5 are illustrative diagrams illustrating exploded perspective views of the digital camera 100 and the lens unit 150 according to the present exemplary embodiment. FIG. 5A is an exploded perspective view illustrating the digital camera 100, and FIG. 5B is an exploded perspective view illustrating the lens unit 150.

As illustrated in FIG. 5A, the camera mount 201 is a mount member of the digital camera 100.

A locking pin 202 is a regulation unit (lock member) for regulating (locking) an attachment state of the digital camera 100 and a camera accessory. The locking pin 202 is biased by a locking pin biasing spring 203, and when the lens unit 150 is attached to the digital camera 100, the locking pin 202 fits into a locking pin groove 301z of the lens mount 301 to lock the state of attachment to each other.

In a case where a lock release button 204 is pressed, the locking pin 202 is released from the locking pin groove 301z, and therefore the lens unit 150 can be removed. The lock release button 204 is held by a mount cover 205 around an outer periphery portion of the camera mount 201. The lock release button 204 is held by the mount cover 205 in the digital camera 100. The lock release button 204 has a shape that fits along an outer periphery of the camera mount recognition ring 206, and the lock release button 204 is disposed along the outer periphery of the camera mount recognition ring 206.

The camera mount recognition ring 206 in the shape of a cylinder is attached around a cylindrical portion of the mount cover 205. Specifically, the camera mount 201 and the mount cover 205 are externally covered by the camera mount recognition ring 206, and the camera mount recognition ring 206 forms a part of the appearance including a portion exposed externally from the digital camera 100.

The camera mount recognition ring 206 is a cylindrical member that has a specific color different from the color of the camera mount 201 and is disposed along the outer periphery (around) of the camera mount 201 having the shape of a ring. Specifically, the camera mount recognition ring 206 is made of a metal material different from the camera mount 201 made of a stainless-steel material, which is a metal material, and has the specific color by additive anodizing processing. Thus, even in the state where the lens unit 150 is attached to the digital camera 100, the specific color of the camera mount recognition ring 206, which is illustrated as the hatched portion in FIGS. 1 and 2, forms the appearance of the digital camera 100 and is visible to a user. Especially, since the camera mount recognition ring 206 has the specific color as described above, the camera mount recognition ring 206 is visible to a user from the outside regardless of whether the lens unit 150 is attached to the digital camera 100.

The camera mount 201, the mount cover 205, and the camera mount recognition ring 206 are arranged in this order from a central axis of the camera mount 201, as a reference (center), toward the outside. The central axis of the camera mount 201 substantially corresponds to an optical axis of the lens unit 150 in the state where the lens unit 150 is attached to the digital camera 100. As described above, the camera mount recognition ring 206 and the camera mount 201 are each made of a metal material. Thus, in order to prevent dissimilar metal corrosion by a potential difference between the camera mount recognition ring 206 and the camera mount 201 disposed in close contact with each other, the mount cover 205 as a protection member made of a non-conductive resin material is provided therebetween.

A camera-side terminal holding member 207 is a holding unit that holds the plurality of terminals (contact point pins) 10 disposed in the digital camera 100.

A camera body member 208 is a housing that holds components of the digital camera 100. Specifically, the camera mount 201, the mount cover 205, and the camera-side terminal holding member 207 are fastened to (held by) the camera body member 208 with a fastening screw (not illustrated). The camera body member 208 also holds the image capturing unit 22 and a shutter 101, which are described above, besides the members of the digital camera 100 that relate to the mount system.

Next, as illustrated in FIG. 5B, a front lens 103a and a rear lens 103b of the lens unit 150 are optical members that are included in the lens 103. While a plurality of imaging lenses is normally arranged in the lens unit 150, only the front lens 103a arranged at an end close to the subject and the rear lens 103b arranged at an end close to the digital camera 100 are illustrated for simplification of the illustration in the present exemplary embodiment. The optical axis of the lens unit 150 is synonymous with an optical axis formed by the lens 103.

The lens mount 301 is a mount member of the lens unit 150. A lens barrel 302 is a lens holding member that holds the lens 103. The lens mount 301 is fastened to (held by) the lens barrel 302 with, for example, a fastening screw (not illustrated).

A lens-side terminal holding member 303 is a holding unit that holds the plurality of terminals (contact surfaces) 6 of the lens unit 150. The lens-side terminal holding member 303 is fastened to the lens mount 301 with a fastening screw (not illustrated).

The lens mount recognition ring 304 having a specific color different from the color of the lens mount 301 is attached around the outer periphery of the lens mount 301 having the shape of a ring. The specific color portion of the lens mount recognition ring 304 forms an appearance exposed externally from the lens barrel 302, and when viewed from the outside, the specific color portion appears to join the lens barrel 302. Specifically, the lens mount 301 is externally covered by the lens mount recognition ring 304 having the shape of a cylinder. In other words, the lens mount recognition ring 304 is a cylindrical member disposed along the outer periphery (around) the lens mount 301.

Like the camera mount recognition ring 206, the lens mount recognition ring 304 is made of an aluminum material and has the specific color by additive anodizing processing. The lens mount 301 is made of a stainless-steel material, which is a metal material, and the lens mount recognition ring 304 and the lens mount 301 are made of a different metal material from each other.

The camera mount recognition ring 206 and the lens mount recognition ring 304 are designed to have the same specific color. The camera mount 201 and the lens mount 301 have substantially the same color. Thus, the camera mount recognition ring 206 and the lens mount recognition ring 304 have the same specific color, and the camera mount 201 and the lens mount 301 have a color that is clearly distinguishable from the specific color. Furthermore, the specific color of the camera mount recognition ring 206 and the lens mount recognition ring 304 is a color that is also different from a main color of an exterior portion (e.g., the lens barrel 302) of the digital camera 100 and the lens unit 150. With this structure, a user can clearly distinguish the specific color portion of the camera mount recognition ring 206 and the lens mount recognition ring 304 from the other portions of the digital camera 100 and the lens unit 150. While, in the present exemplary embodiment, the specific color of the camera mount recognition ring 206 and the lens mount recognition ring 304 is realized by using the same metal material in the camera mount recognition ring 206 and the lens mount recognition ring 304 and conducting the same processing, the camera mount recognition ring 206 and the lens mount recognition ring 304 are to at least have substantially the same specific color.

The lens mount recognition ring 304 is disposed in a circumferential direction perpendicular to the reference surface of the lens mount 301 that is in contact with the camera mount 201, and the specific color portion of the lens mount recognition ring 304 forms an appearance of the lens unit 150. Thus, as illustrated as the hatched portion in FIG. 1 and FIG. 2, even in the state where the lens unit 150 is attached to the digital camera 100, the specific color portion of the lens mount recognition ring 304 that forms an appearance of the lens unit 150 is visible to a user. Furthermore, since the camera mount recognition ring 206 and the lens mount recognition ring 304 have the same specific color, it is easy to recognize the camera mount recognition ring 206 and the lens mount recognition ring 304 as a matching combination (compatible) regardless of whether the lens unit 150 is attached to the digital camera 100.

In the state where the lens unit 150 is attached to the digital camera 100, the reference surfaces of the camera mount 201 and the lens mount 301 are in contact with each other. In this state, the camera mount recognition ring 206 and the lens mount recognition ring 304 are outside the camera mount 201 and the lens mount 301 with respect to the optical axis (central axis). In the state where the lens unit 150 is attached to the digital camera 100, a predetermined clearance is formed, and therefore the camera mount recognition ring 206 and the lens mount recognition ring 304 do not come into direct contact with each other. The lens unit 150 includes a sealing member that fits in the clearance portion and has elasticity to be compressed by a predetermined amount, compared to a state where the lens unit 150 is not attached, in the state where the lens unit 150 is attached to the digital camera 100. Thus, in the state where the lens unit 150 is attached to the digital camera 100, the sealing member fits in the clearance portion formed between the camera mount recognition ring 206 and the lens mount recognition ring 304, and drip-proof and dust-proof performance with respect to the inside of the mount system improves.

Figure 6A:
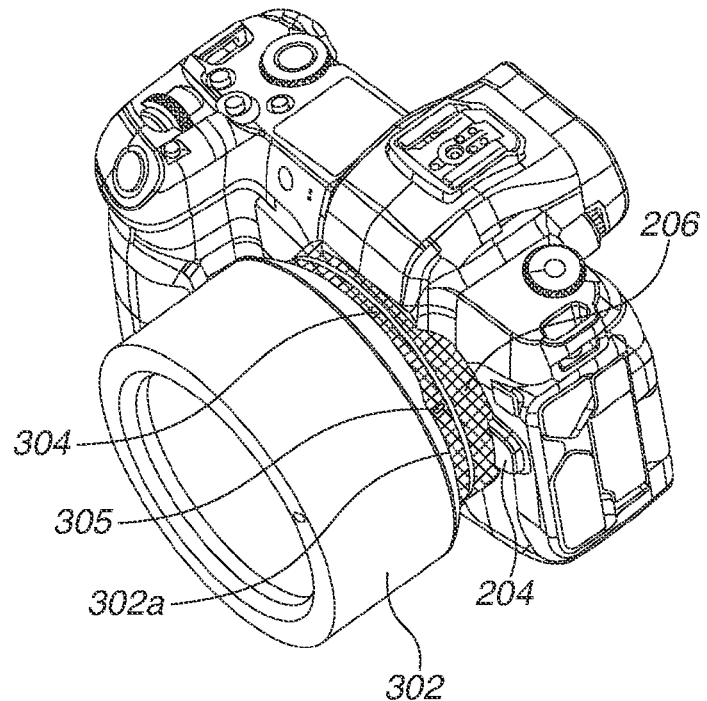
FIG. 6A is an illustrative diagram of a relationship between the digital camera 100 and components of the lens unit 150 and a relationship between a camera mount recognition ring 206 and a lens mount recognition ring 304.
Figure 6B:
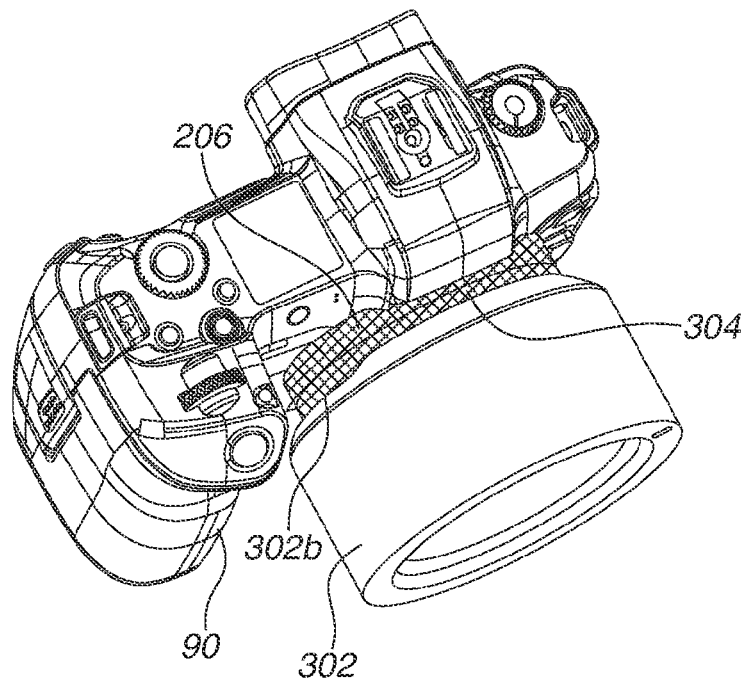
FIG. 6B is an illustrative diagram of a relationship between the digital camera 100 and components of the lens unit 150 and a relationship between the camera mount recognition ring 206 and the lens mount recognition ring 304.

Next, a relationship between shapes of the lens mount recognition ring 304 and the lens barrel 302 of the lens unit 150 attached to the digital camera 100 will illustratively be described below. FIG. 6 are illustrative diagrams illustrating a relationship between components of the digital camera 100 and the lens unit 150 and the camera mount recognition ring 206 and the lens mount recognition ring 304 according to the present exemplary embodiment. FIG. 6A is an illustrative diagram illustrating a relationship between the lock release button 204 and the camera mount recognition ring 206 and the lens mount recognition ring 304. FIG. 6B is an illustrative diagram illustrating a relationship between the grip portion 90 and the camera mount recognition ring 206 and the lens mount recognition ring 304.

The lens barrel 302 includes a first depressed portion (lock release button side depressed portion) 302a near (close to) the lock release button 204. Because of the first depressed portion 302a, like a second depressed portion 302b described below, the portion of the lens mount recognition ring 304, which is externally exposed from the lens unit 150 and forms the appearance, is more (wider) than the other portions, and therefore the lock release button 204 is easy to press for a user. By the lens mount mark 305 disposed at the first depressed portion 302a on the appearance of the lens unit 150, since the lens mount mark 305 is more emphasized than the other portions, a user can recognize the lens mount mark 305 with ease.

The second depressed portion (grip side depressed portion) 302b is disposed near (close to) the grip portion 90. Because of the second depressed portion 302b, like the first depressed portion 302a, the portion of the lens mount recognition ring 304, which is externally exposed from the lens unit 150 and forms the appearance, is more (wider) than the other portions, and therefore the grip portion 90 is easy to grip for a user.

On the contrary, the portions of the lens barrel 302 other than the first depressed portion 302a and the second depressed portion 302b lessens the part of the lens mount recognition ring 304 externally exposed to prevent foreign matters from entering a mount joint portion and to protect the mount joint portion and the recognition rings. Since the external exposure amount of the specific color portion of the lens mount recognition ring 304 is increased at the first depressed portion 302a and the second depressed portion 302b, but not all around the lens barrel 302, the size of the lens unit 150 is reduced.

Figure 7:
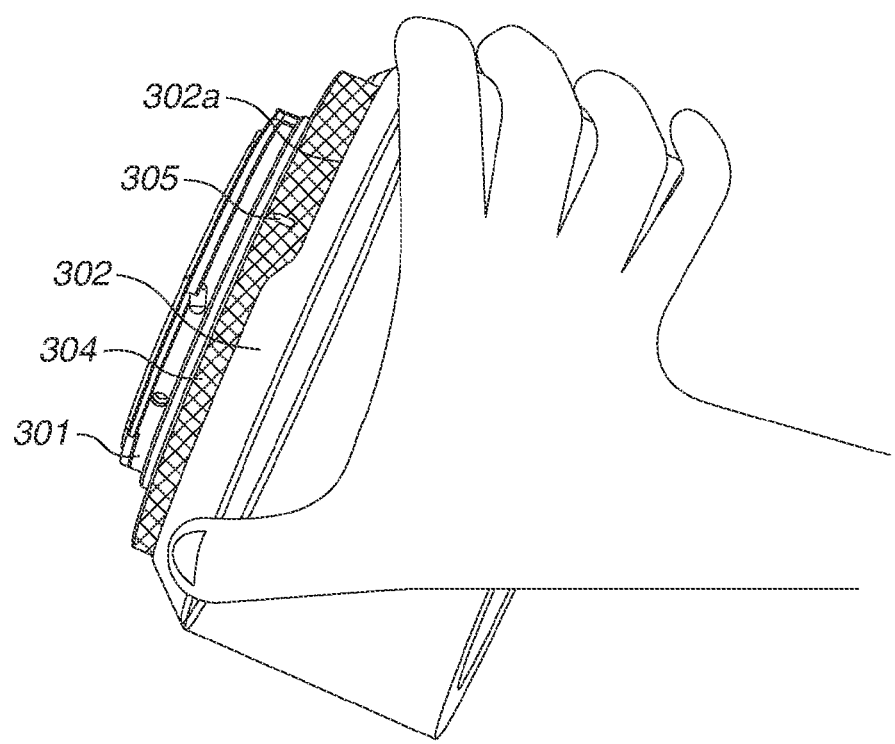
FIG. 7 is an illustrative diagram of a relationship between a lens barrel 302 and the lens mount recognition ring 304 and a lens mount mark 305.

Next, a description will be give of a relationship between the lens mount mark 305, which makes the rotation phase (attachment phase) of the lens mount 301 with respect to the camera mount 201 visible, and the lens mount recognition ring 304 and the lens barrel 302. FIG. 7 is an illustrative diagram illustrating a relationship between the lens barrel 302 and the lens mount recognition ring 304 and the lens mount mark 305 according to the present exemplary embodiment and illustrates a state where the lens unit 150 is held by a hand of a user.

As illustrated in FIG. 7, the lens mount mark 305 is disposed at a side surface of the lens mount recognition ring 304, and in order to make it easy for a user to recognize the lens mount mark 305, the color of the lens mount mark 305 is different from the specific color of the lens mount recognition ring 304. The lens mount mark 305 is disposed not in substantially the same surface as the reference surface of the lens mount 301 but at the side surface of the lens mount recognition ring 304, and therefore the lens mark 305 is easily visible to the user even in the state where the lens unit 150 is attached to the digital camera 100.

The first depressed portion 302a of the lens barrel 302 is disposed near the lens mount mark 305. In other words, the lens mount mark 305 is disposed at a position where the exposed portion of the lens mount recognition ring 304 is more than the other portions due to the first depressed portion 302a. With this structure, the visibility of the lens mount mark 305 increases regardless of whether the lens unit 150 is attached and even in a case where the lens unit 150 is held by a user. Further, since the lens mount mark 305 is disposed not near the second depressed portion 302b but near the first depressed portion 302a, the visibility of the lens mount mark 305 is not decreased by the grip portion 90 even when the lens unit 150 is attached to the digital camera 100.

While an exemplary embodiment of the present invention has been described above, the present invention is not limited to the exemplary embodiment, and various modifications and changes are possible within the spirit of the invention. For example, while a case where a digital camera is employed as an image capturing apparatus is described in the exemplary embodiment, an image capturing apparatus other than digital cameras, such as a digital video camera or security camera, can be employed.

While a case where an accessory (camera accessory) that is attachable to and detachable from an image capturing apparatus is the lens unit 150 is described in the exemplary embodiment, any device that is attachable to and detachable from an image capturing apparatus can be employed as a camera accessory. For example, an adapter (conversion adapter) that is insertable between a camera accessory and the digital camera 100 can be employed as a camera accessory.

Figure 8A:
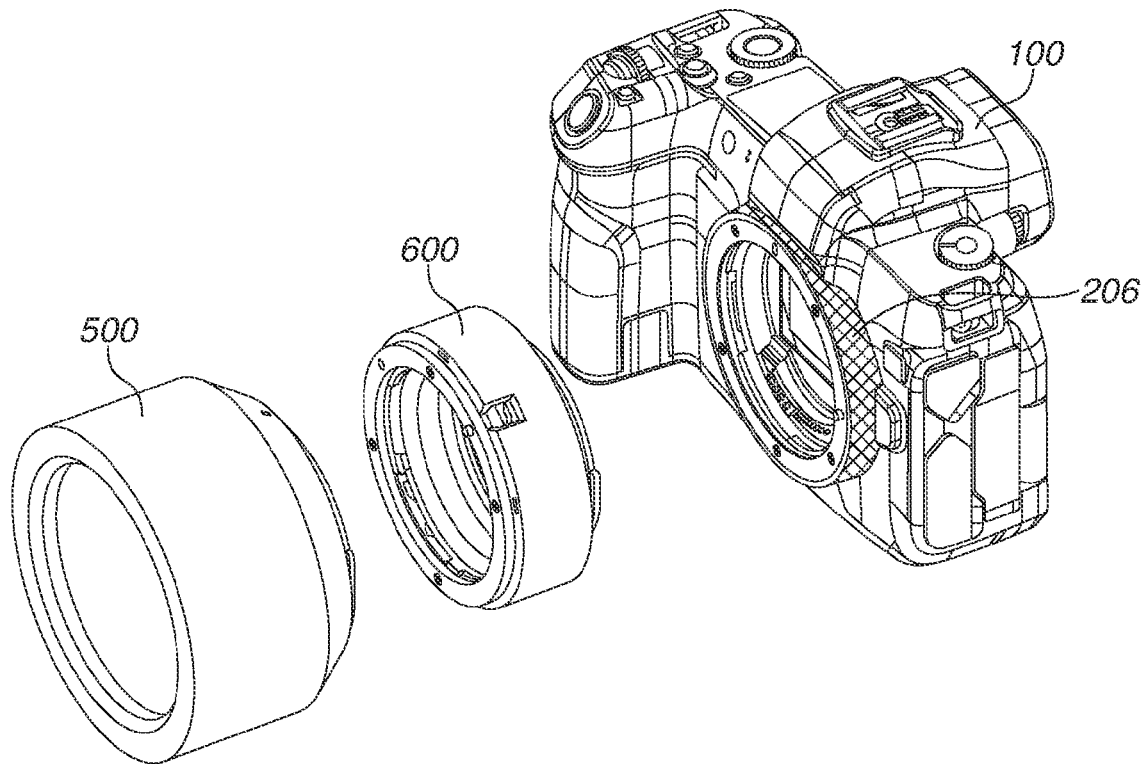
FIG. 8A is an illustrative diagram of a correspondence relationship between various adapters attachable to the digital camera 100 and the digital camera 100.
Figure 8B:
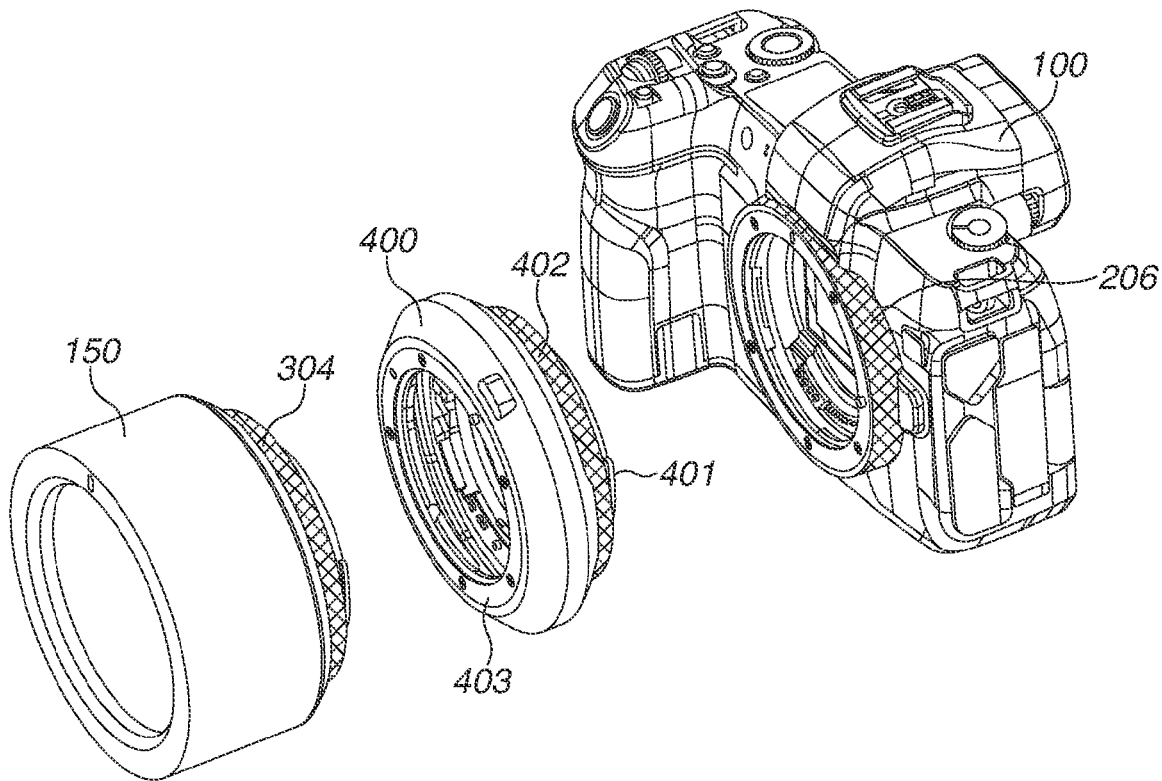
FIG. 8B is an illustrative diagram of a correspondence relationship between various adapters attachable to the digital camera 100 and the digital camera 100.

FIG. 8 are illustrative diagrams illustrating a correspondence relationship between various adapters attachable to the digital camera 100 and the digital camera 100. FIG. 8A is a schematic diagram illustrating a first adapter 600 for attachment of a second lens unit 500 having a flange focal distance and an angle of view different from a corresponding flange focal distance and a corresponding angle of view of the lens unit (first lens unit) 150. FIG. 8B is a schematic diagram illustrating a second adapter 400 that is inserted between the lens unit (first lens unit) 150 and the digital camera 100. The second adapter 400 herein is an adapter inserted between the digital camera 100 and the camera accessory (the lens unit 150 in the figures) for direct attachment to the digital camera 100. Specifically, the first adapter 600 is a camera accessory for indirect attachment of a lens unit that is not designed for direct attachment to the digital camera 100 to the digital camera 100. The second adapter 400 is a camera accessory for indirect attachment of a lens unit that is designed for direct attachment to the digital camera 100 to the digital camera 100. The adapters can include an internal optical system for adjustment of flange focal distance and the like.

As illustrated in FIGS. 8A and 8B, like the lens unit 150, the second adapter 400 includes an adapter mount recognition ring 402 of the specific color around an outer periphery portion, similar to the camera mount recognition ring 206. Specifically, the second adapter 400 includes the adapter mount recognition ring 402 around an outer periphery of a camera mount side mount 401. The adapter mount recognition ring 402 has the specific color similar to the camera mount recognition ring 206. Although not illustrated, a mount mark similar to the lens mount mark 305 of the lens unit 150 is disposed. While FIG. 8B illustrates a case where a recognition ring is not provided to an outer periphery of a lens mount side mount 403 of the second adapter 400 as an example, a recognition ring of the specific color similar to the lens mount recognition ring 304 can be included. Meanwhile, the first adapter 600 does not include a recognition ring similar to the camera mount recognition ring 206 or the lens mount recognition ring 304.

With the above-described structure, a user can easily recognize whether an adapter is for a lens unit (camera accessory) having direct compatibility with the digital camera 100, based on the presence/absence of a recognition ring having the specific color.

While the camera mount recognition ring 206 and the lens mount recognition ring 304 that are made of the same metal material and undergo the same processing to each have the same specific color are described in the exemplary embodiment, the configuration is not limited to those described above. As long as the camera mount recognition ring 206 and the lens mount recognition ring 304 have a similar color which facilitates recognition of a matching combination between the image capturing apparatus and the camera accessory, materials and processing methods are not limited.

While the camera mount recognition ring 206 and the lens mount recognition ring 304 that are cylindrical members (ring members) respectively covering entire circumferences of the camera mount 201 and the lens mount 301 are described in the exemplary embodiment, the configuration is not limited to those described above. As long as a user can at least recognize that the image capturing apparatus and the camera accessory are a matching combination, the camera mount recognition ring 206 and the lens mount recognition ring 304 can, for example, be partially notched.

Further, the lens barrel 302 and the lens mount recognition ring 304 are separate members and the lens barrel 302 includes two depressed portions, and thus each region of the lens mount recognition ring 304 has a different external exposure amount in the exemplary embodiment. Alternatively, the lens barrel 302 and the lens mount recognition ring 304 can be integrated together. The lens mount recognition ring 304 formed correspondingly to the shape of the lens barrel 302 at a joint portion of the lens barrel 302 and the lens mount recognition ring 304 can be employed. Specifically, an appearance in which the specific color portion of the lens mount recognition ring 304 is exposed externally from the lens unit 150 is formed, and the exposure of a specific region of the lens mount recognition ring 304 appears to be wider than the other regions when viewed from a user.

While a case where a digital camera is employed as an example of an image capturing apparatus is described in the exemplary embodiment, an image capturing apparatus other than digital cameras, such as a digital video camera or security camera, can be employed.

The present invention is not limited to the exemplary embodiment described above, and various changes and modifications are possible without departing from the spirit and scope of the present invention. To publish the scope of the present invention, the following claims are attached hereto.

According to the present invention, a matching combination of an image capturing apparatus and an accessory can be easily recognized regardless of a state where the accessory is attached to or detached from the image capturing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A camera system comprising an image capturing apparatus and an accessory that is attachable to and detachable from the image capturing apparatus,
   wherein the image capturing apparatus includes:
      a first mount portion and a first cylindrical member that has a color different from a color of the first mount portion and is disposed in a circumferential direction of the first mount portion,
   wherein the accessory includes:
      a second exterior portion, a second mount portion, and a second cylindrical member having a color different from a color of the second mount portion and similar to the color of the first cylindrical member and disposed in a circumferential direction of the second mount portion,
   wherein the second exterior portion has a color different from the second cylindrical member, and
   wherein in a state where the accessory is attached to the image capturing apparatus,
      reference surfaces of the first mount portion and the second mount portion are in contact with each other, and
      the first cylindrical member and the second cylindrical member are externally exposed regardless of whether the accessory is attached to or detached from the image capturing apparatus.

2. The camera system according to claim 1, wherein in the state where the accessory is attached to the image capturing apparatus, the first cylindrical member and the second cylindrical member are close to each other.

3. The camera system according to claim 1,
   wherein the accessory includes a first mark by which a user visually recognizes a rotation phase of the accessory with respect to the image capturing apparatus,
   wherein the second exterior portion includes a depressed portion where the second cylindrical member is externally exposed more than another portion, and
   wherein the first mark is disposed at a position corresponding to the depressed portion of the second cylindrical member.

4. The camera system according to claim 3, wherein the second cylindrical member is in a continuous form to the second exterior portion.

5. The camera system according to claim 3,
   wherein the image capturing apparatus includes:
      an operation member that releases a lock of the accessory in the state
      where the accessory is attached to the image capturing apparatus, and
      a grip portion to be held by a user,
   wherein the accessory includes a first depressed portion and a second depressed portion as the depressed portion, and
   wherein in the state where the accessory is attached to the image capturing apparatus,
      the first depressed portion is close to the operation member, and
      the second depressed portion is close to the grip portion.

6. The camera system according to claim 5, wherein the first mark is disposed at a position corresponding to the first depressed portion.

7. The camera system according to claim 3, wherein the image capturing apparatus includes a second mark corresponding to the first mark of the accessory in attaching the accessory to the image capturing apparatus.

8. The camera system according to claim 7, wherein the second mark is disposed on the reference surface of the first mount portion and is not externally exposed from the image capturing apparatus in the state where the accessory is attached to the image capturing apparatus.

9. The camera system according to claim 1, wherein the first cylindrical member and the second cylindrical member are made of a same metal material to have a same specific color.

10. The camera system according to claim 9, wherein the same specific color is different from the colors of the first mount portion and the second mount portion.

11. The camera system according to claim 1, wherein the first cylindrical member and the second cylindrical member undergo same processing to have a same specific color.

12. The camera system according to claim 1, wherein the image capturing apparatus includes a first exterior portion, and
   wherein the first exterior portion has a color different from the first cylindrical member.

13. An image capturing apparatus of a camera system comprising the image capturing apparatus and an accessory that is attachable to and detachable from the image capturing apparatus,
   wherein the image capturing apparatus includes:
      a first mount portion and a first cylindrical member that has a color different from a color of the first mount portion and is disposed in a circumferential direction of the first mount portion,
   wherein the accessory includes:
      a second exterior portion, a second mount portion, and a second cylindrical member having a color different from a color of the second mount portion and similar to the color of the first cylindrical member and disposed in a circumferential direction of the second mount portion,
   wherein the second exterior portion has a color different from the second cylindrical member,
   wherein in a state where the accessory is attached to the image capturing apparatus,
      reference surfaces of the first mount portion and the second mount portion are in contact with each other, and
      the first cylindrical member and the second cylindrical member are externally exposed from the image capturing apparatus regardless of whether the accessory is attached to or detached from the image capturing apparatus, and
      wherein the image capturing apparatus includes a protection member made of a non-conductive resin material between the first mount portion and the first cylindrical member.

14. The image capturing apparatus of the camera system according to claim 13, wherein in the state where the accessory is attached to the image capturing apparatus, the first cylindrical member and the second cylindrical member are close to each other.

15. The image capturing apparatus of the camera system according to claim 13,
wherein the image capturing apparatus includes:
an operation member that releases a lock of the accessory in the state,
where the accessory is attached to the image capturing apparatus, and
a grip portion to be held by a user,
wherein the second exterior portion of the accessory includes a first depressed portion and a second depressed portion where the second cylindrical member is externally exposed more than another portion, and
wherein in the state where the accessory is attached to the image capturing apparatus,
the first depressed portion is close to the operation member, and
the second depressed portion is close to the grip portion.

16. The image capturing apparatus of the camera system according to claim 15,
wherein the image capturing apparatus includes a second mark, corresponding to a first mark of the accessory, by which a user visually recognizes a rotation phase of the accessory with respect to the image capturing apparatus in attaching the accessory to the image capturing apparatus,
wherein the first mark is disposed at a position corresponding to the first depressed portion of the second cylindrical member, and
wherein the second mark is disposed on the reference surface of the first mount portion and is not externally exposed from the image capturing apparatus in the state where the accessory is attached to the image capturing apparatus.

17. The image capturing apparatus of the camera system according to claim 13, wherein the first cylindrical member and the second cylindrical member are made of a same metal material to have a same specific color.

18. The image capturing apparatus of the camera system according to claim 17, wherein the same specific color is different from the color of the first mount portion.

19. The image capturing apparatus of the camera system according to claim 13, wherein the first cylindrical member and the second cylindrical member undergo same processing to have a same specific color.

20. The image capturing apparatus of the camera system according to claim 13, wherein the image capturing apparatus includes a first exterior portion, and
wherein the first exterior portion has a color different from the first cylindrical member.

21. A camera system comprising an image capturing apparatus and an accessory that is attachable to and detachable from the image capturing apparatus,
wherein the image capturing apparatus includes a first mount portion and a first cylindrical member that has a color different from a color of the first mount portion and is disposed in a circumferential direction of the first mount portion,
wherein the accessory includes:
a second exterior portion, a second cylindrical member having a color different from a color of the second exterior portion and similar to the color of the first cylindrical member, and
a second mount portion having a reference surface that is in contact with a reference surface of the first mount portion in a state where the accessory is attached to the image capturing apparatus,
wherein the second exterior portion has a color different from the second cylindrical member,
wherein the first cylindrical member and the second cylindrical member form an appearance regardless of whether the accessory is attached to or detached from the image capturing apparatus, and
wherein the image capturing apparatus includes a protection member made of a non-conductive resin material between the first mount portion and the first cylindrical member.

22. The camera system according to claim 21,
wherein the first cylindrical member forms a portion of the appearance of the image capturing apparatus regardless of whether the accessory is attached to or detached from the image capturing apparatus, and
wherein the second cylindrical member forms a portion of the appearance of the accessory regardless of whether the accessory is attached to or detached from the image capturing apparatus.

23. The camera system according to claim 21, wherein in the state where the accessory is attached to the image capturing apparatus, the first cylindrical member and the second cylindrical member are close to each other.

24. The camera system according to claim 21,
wherein the accessory includes a first mark by which a user can visually recognize a rotation phase of the accessory with respect to the image capturing apparatus,
wherein the second exterior portion includes a depressed portion where the second cylindrical member forms the appearance more than another portion in an optical axis direction, and
wherein the depressed portion is disposed at a position corresponding to the first mark.

25. The camera system according to claim 24, wherein the second cylindrical member is in a continuous form to the second exterior portion.

26. The camera system according to claim 24,
wherein the image capturing apparatus includes:
an operation member that releases a lock of the accessory in the state,
where the accessory is attached to the image capturing apparatus, and
a grip portion to be held by the user,
wherein the accessory includes a first depressed portion and a second depressed portion as the depressed portion, and
wherein in the state where the accessory is attached to the image capturing apparatus,
the first depressed portion is close to the operation member, and
the second depressed portion is close to the grip portion.

27. The camera system according to claim 26, wherein the first mark is disposed at a position corresponding to the first depressed portion.

28. The camera system according to claim 24, wherein the reference surface of the first mount portion of the image capturing apparatus includes a second mark corresponding to the first mark of the accessory in attaching the accessory to the image capturing apparatus.

29. The camera system according to claim 28, wherein the second mark is not externally exposed from the image capturing apparatus in the state where the accessory is attached to the image capturing apparatus.

30. The camera system according to claim 21, wherein the first cylindrical member and the second cylindrical member are made of a same metal material to have a same specific color.

31. The camera system according to claim 30, wherein the same specific color is different from the colors of the first mount portion and the second mount portion.

32. The camera system according to claim 30, wherein the first cylindrical member and the second cylindrical member undergo same processing to have a same specific color.

33. The camera system according to claim 21, wherein the image capturing apparatus includes a first exterior portion, and wherein the first exterior portion has a color different from the first cylindrical member.

34. An image capturing apparatus of a camera system comprising the image capturing apparatus and an accessory that is attachable to and detachable from the image capturing apparatus, wherein the image capturing apparatus includes:
a first mount portion and a first cylindrical member that has a color different from a color of the first mount portion and is disposed in a circumferential direction of the first mount portion, wherein the accessory includes:
a second exterior portion, a second cylindrical member having a color similar to the color of the first cylindrical member, and
a second mount portion having a reference surface that is in contact with a reference surface of the first mount portion in a state where the accessory is attached to the image capturing apparatus, wherein the second exterior portion has a color different from the second cylindrical member, wherein the first cylindrical member and the second cylindrical member form an appearance regardless of whether the accessory is attached to or detached from the image capturing apparatus, and wherein the image capturing apparatus includes a protection member made of a non-conductive resin material between the first mount portion and the first cylindrical member.

35. The image capturing apparatus of the camera system according to claim 34, wherein the first cylindrical member forms a portion of the appearance of the image capturing apparatus regardless of whether the accessory is attached to or detached from the image capturing apparatus.

36. The image capturing apparatus of the camera system according to claim 35, wherein the image capturing apparatus includes:
an operation member that releases a lock of the accessory in the state where the accessory is attached to the image capturing apparatus, and
a grip portion to be held by a user, wherein the second exterior portion of the accessory includes a first depressed portion and a second depressed portion where the second cylindrical member is externally exposed more than another portion, and wherein in the state where the accessory is attached to the image capturing apparatus,
the first depressed portion is close to the operation member, and
the second depressed portion is close to the grip portion.

37. The image capturing apparatus of the camera system according to claim 35, wherein the image capturing apparatus includes:
an operation member that releases a lock of the accessory in the attached state, and
a grip portion to be held by a user, wherein the second exterior portion of the accessory includes a first depressed portion and a second depressed portion where the second cylindrical member is externally exposed more than another portion, where the accessory is attached to the image capturing apparatus, and wherein in the state where the accessory is attached to the image capturing apparatus,
the first depressed portion is close to the operation member, and
the second depressed portion is close to the grip portion.

38. The camer system according to claim 37, wherein the second mark is not externally exposed from the image capturing apparatud on the state where the accessory is attached to the image capturing apparatus.

39. The image capturing apparatus of the camera system according to claim 34, wherein the first cylindrical member and the second cylindrical member are made of a same metal material to have a same specific color.

40. The image capturing apparatus of the camera system according to claim 39, wherein the same specific color is different from the color of the first mount portion.

41. The image capturing apparatus of the camera system according to claim 34, wherein the first cylindrical member and the second cylindrical member undergo same processing to have a same specific color.

42. The camera system according to Claim 34, wherein the image capturing apparatus includes a first exterior portion, and wherein the first exterior portion has a color different from the first cylindrical member.

* * * * *